US011089510B2

(12) United States Patent
Ryan

(10) Patent No.: US 11,089,510 B2
(45) Date of Patent: Aug. 10, 2021

(54) GENERATING RADIO DATA-CHANNEL ACCESS ADDRESSES FROM A BASE ADDRESS SEED

(71) Applicant: Nordic Semiconductor ASA, Trondheim (NO)

(72) Inventor: Daniel Ryan, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 18 days.

(21) Appl. No.: 16/635,491

(22) PCT Filed: Jul. 27, 2018

(86) PCT No.: PCT/GB2018/052120
§ 371 (c)(1),
(2) Date: Jan. 30, 2020

(87) PCT Pub. No.: WO2019/025766
PCT Pub. Date: Feb. 7, 2019

(65) Prior Publication Data
US 2020/0359262 A1    Nov. 12, 2020

(30) Foreign Application Priority Data

Aug. 1, 2017   (GB) ...................................... 1712334
Aug. 29, 2017  (GB) ...................................... 1713785

(51) Int. Cl.
*H04W 28/06* (2009.01)
*H04W 4/80* (2018.01)
*H04L 12/741* (2013.01)

(52) U.S. Cl.
CPC ........... *H04W 28/065* (2013.01); *H04L 45/74* (2013.01); *H04W 4/80* (2018.02)

(58) Field of Classification Search
CPC .................................................... H04W 28/06
See application file for complete search history.

(56) References Cited

U.S. PATENT DOCUMENTS 7,502,840 B1   3/2009  Bakke
9,712,951 B2   7/2017  Kirshenberg et al.
(Continued)

FOREIGN PATENT DOCUMENTS

EP   2 934 030 A1   10/2015
GB       2494550 A    3/2013
(Continued)

OTHER PUBLICATIONS

Bluetooth Core Specification, Version 5.0, Bluetooth SIG Proprietary, Dec. 6, 2016, pp. 402-410, 1726-1733, and 2563-2706.
(Continued)

*Primary Examiner* — Sulaiman Nooristany
(74) *Attorney, Agent, or Firm* — Klarquist Sparkman, LLP

(57) ABSTRACT

A radio communication apparatus receives or generates a base address seed, and generates data-channel access addresses from the seed. Each access address corresponds to a respective data-channel identifier, and is generated by setting a bit at a common first bit position to the value of a bit at a first common predetermined bit position in the base address seed or in the respective data-channel identifier; by setting a bit at a common second bit position to the bitwise complement of this value; and by setting one or more remaining bit positions in dependence on values at one or more bit positions in the base address seed and one or more bit positions in the respective data-channel identifier that are not the first common predetermined bit position. The apparatus can send or receive a radio data packet comprising an access address from the generated set.

32 Claims, 6 Drawing Sheets

$$a_{31}a_{30}\ldots a_1a_0 = base\_address$$

$$b_6b_5b_4b_3b_2b_1b_0 = ((M \times channel\_ID) + S) \text{ MOD } 128$$

| Bit index:  | 31 ... 26 | 25 | 24 | 23 | 22 | 21 | 20 | 19 | 18 | 17 | 16 | 15 ... 0 |
|---|---|---|---|---|---|---|---|---|---|---|---|---|
| Bit value: | $b_0 \oplus (a_{31}a_{30}a_{29}a_{28}a_{27}a_{26})$ | $b_1$ | $b_6 \oplus a_{24}$ | $\bar{b}_1$ | $\bar{a}_{15}$ | $b_5b_4 \oplus a_{21}a_{20}$ | $a_{15}$ | $b_3b_2 \oplus a_{18}a_{17}$ | $\bar{a}_{15}$ | $a_{15}a_{14} \ldots a_1a_0$ |

(56) References Cited

U.S. PATENT DOCUMENTS

| | | | |
|---|---|---|---|
| 2008/0125037 A1 | 5/2008 | Ibrahim et al. | |
| 2009/0180464 A1* | 7/2009 | Walley | H04L 7/042 370/350 |
| 2013/0045684 A1 | 2/2013 | Linde et al. | |
| 2014/0086125 A1 | 3/2014 | Polo et al. | |
| 2015/0365208 A1 | 12/2015 | Hyun et al. | |

FOREIGN PATENT DOCUMENTS

| WO | WO 02/39484 A2 | 5/2002 |
|---|---|---|
| WO | WO 2016/007186 A1 | 1/2016 |
| WO | WO 2019/025767 A1 | 2/2019 |

OTHER PUBLICATIONS

International Search Report and Written Opinion for PCT/GB2018/052120, dated Oct. 31, 2018, 15 pages.

Search Report under Section 17(5) for GB1712334.0, dated Dec. 18, 2017, 3 pages.

\* cited by examiner $a_{31}a_{30}\ldots a_1a_0 = \mathit{base\_address}$ $b_6b_5b_4b_3b_2b_1b_0 = (61 \times \mathit{channel\_ID})\ \mathrm{MOD}\ 128$

| Bit index: | 31 … 26 | 25 | 24 | 23 | 22 | 21 | 20 | 19 | 18 | 17 | 16 | 15 … 0 |
|---|---|---|---|---|---|---|---|---|---|---|---|---|
| Bit value: | $b_0 \oplus (a_{31}a_{30}a_{29}a_{28}a_{27}a_{26})$ | $b_1$ | $b_6 \oplus a_{24}$ | $\bar{b}_1$ | $\bar{a}_{15}$ | $b_5b_4 \oplus a_{21}a_{20}$ | $a_{15}$ | $b_3b_2 \oplus a_{18}a_{17}$ | $\bar{a}_{15}$ | $a_{15}a_{14}\ldots a_1a_0$ |

FIG. 2

$a_{31}a_{30}\ldots a_1a_0 = \textit{base\_address}$ $b_6b_5b_4b_3b_2b_1b_0 = ((M \times \textit{channel\_ID}) + S) \text{ MOD } 128$

| Bit index: | 31 ... 26 | 25 | 24 | 23 | 22 | 21 | 20 | 19 | 18 | 17 | 16 | 15 ... 0 |
|---|---|---|---|---|---|---|---|---|---|---|---|---|
| Bit value: | $b_0 \oplus (a_{31}a_{30}a_{29}a_{28}a_{27}a_{26})$ | $b_1$ | $b_6 \oplus a_{24}$ | $\bar{b}_1$ | $\bar{a}_{15}$ | $b_5b_4 \oplus a_{21}a_{20}$ | $a_{15}$ | $a_{15}$ | $b_3b_2 \oplus a_{18}a_{17}$ | $a_{15}$ | $\bar{a}_{15}$ | $a_{15}a_{14}\ldots a_1a_0$ |

FIG. 3

$a_{31}a_{30}\ldots a_1a_0 = \textit{base\_address}$ $b_6b_5b_4b_3b_2b_1b_0 = (61 \times \textit{channel\_ID}) \textrm{ MOD } 128$

| Bit index: | 31 ... 26 | 25 | 24 | 23 | 22 | 21 ... 17 | 16 | 15 ... 0 |
|---|---|---|---|---|---|---|---|---|
| Bit value: | $b_0 \oplus (a_{31}a_{30}a_{29}a_{28}a_{27}a_{26})$ | $b_1$ | $\bar{b}_1$ | $\bar{a}_{15}$ | $a_{15}$ | $b_6b_5b_4b_3b_2 \oplus a_{21}a_{20}a_{19}a_{18}a_{17}$ | $\bar{a}_{15}$ | $a_{15}a_{14}\ldots a_1a_0$ |

FIG. 5

$a_{31}a_{30}\ldots a_1a_0 = \textit{base\_address}$ $b_6b_5b_4b_3b_2b_1b_0 = ((M \times \textit{channel\_ID}) + S) \text{ MOD } 128$

| Bit index: | 31 ... 26 | 25 | 24 | 23 | 22 | 21 ... 17 | 16 | 15 ... 0 |
|---|---|---|---|---|---|---|---|---|
| Bit value: | $b_0 \oplus (a_{31}a_{30}a_{29}a_{28}a_{27}a_{26})$ | $b_1$ | $\bar{b}_1$ | $\bar{a}_{15}$ | $a_{15}$ | $b_6b_5b_4b_3b_2 \oplus a_{21}a_{20}a_{19}a_{18}a_{17}$ | $\bar{a}_{15}$ | $a_{15}a_{14}\ldots a_1a_0$ |

FIG. 6

GENERATING RADIO DATA-CHANNEL ACCESS ADDRESSES FROM A BASE ADDRESS SEED

CROSS REFERENCE TO RELATED APPLICATIONS

This is the U.S. National Stage of International Application No. PCT/GB2018/052120, filed Jul. 27, 2018, which was published in English under PCT Article 21(2), which in turn claims the benefit of Great Britain Application No. 1713785.2, filed Aug. 29, 2017 and Great Britain Application No. 1712334.0, filed Aug. 1, 2017.

This invention relates to radio communication apparatus and methods.

In digital radio communication systems, it is often necessary for multiple logical links or channels, between two or more parties, to share limited bandwidth within one physical channel. This is sometimes achieved by labelling each data packet with a label that identifies a particular channel. Depending on the radio protocol or context, this label may be called "access address", "address", "access code, "logical-link identifier", "synchronization word", "synchronization signal", etc. Radio receivers can then choose to process data packets from one or more logical channels of interest, while discarding data packets from other logical channels within the same physical channel, based on the channel labels contained in the data packets. A receiving device may configure a correlator to use a desired channel label as a correlation code, in order to distinguish data packets belonging to a desired logical channel from other data packets.

Although channel label could, in theory, be randomly-generated, in practice it can be beneficial if they meet certain conditions, so as to ensure desirable autocorrelation performance, and good separation between different channel labels under cross-correlation. Thus, each channel label generated by a device might be tested and, if a particular randomly-generated value does not meet the requirements, new random values may be generated until a value is found that does meet the requirements.

For example, in Bluetooth™ Low Energy (BLE), as defined in the Bluetooth™ Core Specification v 5.0, radio packets contain a 4-byte "Access Address", which is located immediately after a packet preamble and immediately before a protocol-data-unit (PDU), which is followed by a cyclic redundancy check (CRC). Different logical channels are associated with different 32-bit Access Addresses, which are randomly generated. Advertising packets in BLE use a predefined Access Address of 0x8E89BED6. Every other BLE Access Address must be such that it:

(i) differs from the Access Address for any existing Link Layer connection on the device;
(ii) is not the Access Address for any enabled periodic advertising;
(iii) has no more than six consecutive zeros or ones;
(iv) is not the advertising channel packets' Access Address;
(v) is not a sequence that differs from the advertising channel packets' Access Address by only one bit;
(vi) does not have all four octets equal;
(vii) has no more than 24 bit transitions; and
(viii) has a minimum of two transitions in its most significant six bits.

If coded symbols are used, the Access Address must also meet the requirements that:

(ix) it shall have at least three ones in its least significant 8 bits; and
(x) it shall have no more than eleven transitions in its least significant 16 bits.

Other radio protocols may impose different conditions. In some cases, certain conditions may not be imposed, but it may nevertheless be desirable to meet them in order to achieve better reliability.

Typically, a channel label or access address will be generated by one device, and then communicated to others devices, so that the label can be used by all the relevant devices to communicate on a corresponding channel.

There may be situations, however, in which it is beneficial for radio communication devices (implementing any appropriate radio protocol) to derive one or more data-channel labels or access addresses from a base address seed and a data-channel number. This can allow a set of associated data channels (e.g., a left audio channel, and a right audio channel, in a stereo audio stream) to be advertised with a single base address seed. Any device that wishes to subscribe to one or more of these data channels can then generate the necessary access addresses from the respective data-channel numbers (which may be fixed in advance) and the base address seed. This can reduce the advertising or channel-establishment overhead for the set of channels, by requiring only the base address to be shared among the devices, and not each individual access address. It is not obvious, however, how to do this efficiently, while also providing the generated data-channel access addresses with desirable correlation properties.

The present invention seeks to provide a novel mechanism for generating data-channel access addresses from a base address seed. (A "data channel", as used herein, may refer generally to any one-way, two-way or multi-way flow of data that is distinguishable from other flows of data by means of a particular access address; it is not intended to be limited to a definition from any particular radio protocol or standard.)

From a first aspect, the invention provides a radio communication apparatus configured to:

receive or generate a base address seed;
generate a set of one or more data-channel access addresses from the base address seed, each said data-channel access address corresponding to a respective data-channel identifier from a set of one or more data-channel identifiers, wherein the generating of each access address comprises:
  setting the value of a bit at a common first bit position in the respective access address to be equal to the value of a bit at a first common predetermined bit position in the base address seed or in the respective data-channel identifier;
  setting the value of a bit at a common second bit position in the respective access address to be equal to the bitwise complement of the value of the bit at said first common predetermined bit position in the base address seed or in the respective data-channel identifier; and
  setting values of one or more bits at one or more of the remaining bit positions in the respective access address in dependence on the values of one or more bits at one or more bit positions in the base address seed and one or more bit positions in the respective data-channel identifier that are not said first common predetermined bit position in the base address seed or in the respective data-channel identifier; and
send or receive a radio data packet comprising an access address from the generated set of data-channel access addresses, according to a predetermined radio protocol.

From a second aspect, the invention provides a method of communicating by radio, comprising:

receiving or generating a base address seed;

generating a set of one or more data-channel access addresses from the base address seed, each said data-channel access address corresponding to a respective data-channel identifier from a set of one or more data-channel identifiers, wherein the generating of each access address comprises:

setting the value of a bit at a common first bit position in the respective access address to be equal to the value of a bit at a first common predetermined bit position in the base address seed or in the respective data-channel identifier;

setting the value of a bit at a common second bit position in the respective access address to be equal to the bitwise complement of the value of the bit at said first common predetermined bit position in the base address seed or in the respective data-channel identifier; and setting values of one or more bits at one or more of the remaining bit positions in the respective access address in dependence on the values of one or more bits at one or more bit positions in the base address seed and one or more bit positions in the respective data-channel identifier that are not said first common predetermined bit position in the base address seed or in the respective data-channel identifier; and sending or receiving a radio data packet comprising an access address from the generated set of data-channel access addresses, according to a predetermined radio protocol.

Thus it will be seen by those skilled in the art that, in accordance with the invention, a set of data-channel access addresses is generated from a base address seed, with every access address containing a pair of complementary bits, at predetermined positions. This has the effect of preventing all the bits, extending from the first bit position to the second position, having the same value, in any of the access addresses. This limits the maximum length of a run of identical bit values in the access addresses, at least in the region from the first bit position to the second bit position. This is desirable as runs of identical bits in an access address can reduce the autocorrelation performance of the address and can reduce the distance between pairs of different addresses (but both containing runs of the same bit value) under cross-correlation.

The predetermined radio protocol may be any proprietary radio protocol or a standardised radio protocol, such as a protocol based on IEEE 802.15.4, Bluetooth™ Bluetooth Low Energy™, Z-Wave™, ZigBee™, etc.

The predetermined radio protocol may require each access address to contain no more than a predetermined number of successive "zero" or "one" bits within a contiguous portion of the access address that contains the common first and second bit positions. The second bit position may be offset from the first bit position by no more than said predetermined number of bits (where adjacent bits would be considered to be offset by one bit).

The base address seed may be received by the radio communication apparatus in a radio transmission, such as an advertising packet or other broadcast message. Alternatively, the base address seed may be generated by the radio communication apparatus. The radio communication apparatus may be configured to broadcast the base address seed in a radio advertising message. The base address seed may be generated at random (e.g., using a true- or pseudo-random-number generator). It preferably has a predetermined length—e.g., 32 bits. It may be generated at random such that every possible bit string of the predetermined length has an equal probability of being the base address seed, but preferably the base address seed meets one or more predetermined conditions. The base address seed may satisfy one or more predetermined conditions relating to the distribution of bit values within the base address seed. For example, it may satisfy one or more, or all, of the conditions (i) to (viii), or (i) to (x), set out above.

The set of data-channel identifiers may be received by the radio communication apparatus—e.g., in a radio transmission, such as an advertising packet. It may be generated by the radio communication apparatus. It may be stored in the radio communication apparatus. It may be predetermined—e.g., pre-stored in a memory of the radio communication apparatus. Each data-channel access address preferably corresponds to a different respective data-channel identifier. The data-channel identifiers may be generated from a set of integers—preferably a sequence of successive integers, such as the non-negative integers starting from 0 or 1. These integers may correspond to respective data-channel numbers. The identifiers may be generated (by the radio communication apparatus or externally) by applying a function to a sequence of integers. The function may use modular arithmetic; it may comprise a modulo multiplication operation and/or a modulo addition or subtraction operation. The function preferably increases the average Hamming distance between the members of the set of data-channel identifiers, compared with the averaged Hamming distance between the integers in the sequence of integers. This can advantageously lead to greater diversity in the access addresses. Thus, each data-channel identifier of the set of one or more data-channel identifiers may equal the value of said function when applied to a respective integer from a corresponding sequence of one or more integers.

In one set of embodiments, the identifiers are generated by multiplying each integer of the sequence of integers by a first value, modulo a second value. In some embodiments, the function may comprise an addition of a summand (preferably non-zero) to a multiplication by the first value, modulo the second value. Such an addition has been found to provide greater potential for generating a set of access addresses that has desirable properties. For example, by selecting appropriate values greater separation can be achieved between the access addresses generated by low-valued integer inputs to the function, which may be most commonly used channel numbers. Also, it may be possible to achieve a desired minimum Hamming distance between the generated addresses and a particular access address associated with a special one of the data channels, such as data-channel zero (which may be used as a control channel in some embodiments).

The first value may be constant; it is preferably an integer greater than one. The optional summand value may be constant; it is preferably an integer greater than zero. The second value may be constant. The second value may be a power of two, such as 128. The first value may be a prime number, such as 61. However, this is not essential, and in another set of embodiments the first value is 35. The summand may take any appropriate value, such as 27, 42, etc. A preferred set of embodiments uses a first value of 35 and a summand value of 42. This has been found to generate a set of 32 data-channel access addresses, for data-channel numbers zero to 31, that has desirable correlation properties for typically use cases, including having a Hamming weight distance of at least 4 for all pairs of data-channel numbers that are less than four channels apart. More generally, the use of a diversifier function comprising at least one modular arithmetic operation can be used to generate a set of data-channel identifiers (e.g., a set of 32 identifiers) that has a high average Hamming distance between its members, which can lead to access addresses that have desirable correlation properties.

In one set of embodiments, the set of data-channel identifiers contains up to 32 data-channel identifiers. The radio communication apparatus may be arranged to generate a set of up to 32 data-channel access addresses. The data-channel identifiers may be shorter than the base address seed and/or the data-channel access addresses. In one set of embodiments, each data-channel identifier is 7 bits long. In one set of embodiments, the base address seed is 32 bits long, and each access address is 32 bits long. Of course, other lengths and quantities are possible in other embodiments.

The set of data-channel access addresses may, in some instances, contain only one access address. In other embodiments, it may comprise two or more data-channel access addresses. The set may be generated all at once—e.g., before the apparatus sends or receives any radio data packets comprising an access address from the set—or the access addresses may be generated as they needed—e.g., in response to a requirement to start using an additional data channel.

The common first bit position may be adjacent the common second bit position. This can prevent the access addresses from containing a run of identical bits that spans the first and second bit positions. In this case, the first and second bit positions may be offset from each first and last bits of the access address by at least one bit.

The first bit position and the second bit position may be offset by an even number of bits—that is, having an odd number of intervening bits (e.g. having one, three or five bits in between them). This prevents any of the access addresses from containing a run of alternating bits (e.g., " . . . 1010101010 . . . ") spanning the first and second bit positions. This can reduce the chance of false correlation matches between access addresses.

It will be appreciated that bit positions in the access addresses, base address seed and data-channel identifiers may be numbered or indexed in any convenient manner, such as being numbered consecutively using non-negative integers from one end of the address or identifier. The indexing could start from a least-significant bit, a most-significant bit, a first-transmitted bit, or a last-transmitted bit.

The access addresses may all have a length that is a multiple of eight bits (e.g., 8, 16, 24 or 32 bits) long. The first bit position and the second bit position may then be in different octets of the access addresses. This can reduce the probability of the same octet appearing twice within an access address, compared with if the first and second bit positions are in the same octet.

The common first bit position and the common second bit position may have the same index, modulo eight. This prevents the two octets containing the two respective bit positions from being identical. Reducing or eliminating the incidence of repeated octets appearing within the access addresses can help to avoid certain correlation problems, for example if a data packet containing the access address has two or more repeated octets, and the rest of the data packet has a further occurrence of the repeated octet adjacent the access address—e.g., at the end of a preamble located immediately before the access address. Data packets containing access addresses that look like the preambles that precede them increase the risk that the access address is determined to have arrived earlier than it actually does—e.g. a preamble that ends 0xAAAA may cause problems when followed by an access address that starts 0xAAAA. A radio which is tuned slightly to the wrong frequency when receiving could interpret a preamble as part of the address if they are too similar. More generally, any access address and adjacent data that contain two or more incidences of a pattern of bits, next to each other and spanning the access address and adjacent data, pose a risk of the correlator mis-identifying the access address. A distance of D bits between the first bit position and the second bit positions ensures there are no periodic repetitions with period M bits, spanning the first and second bit positions, where M is a divisor of D.

Generating each access address may comprise setting bit values at one or more of said remaining bit positions in the respective access address to be equal to respective bit values in the base address seed at one or more bit positions that are equal to said remaining bit positions (under a common bit-numbering system for all the addresses), or that are derived therefrom according to a bit-position mapping function. The one or more of said remaining bit positions may be or comprise a plurality of consecutive bit positions. For example, the first sixteen bits of each access address may be set equal to the first sixteen bits of the base address seed. This can enable a desirable property or properties of the base address seed, over these one or more bit positions (such as having no more than six consecutive zeros or ones), to be imparted to the access addresses.

Generating each access address may comprise setting bit values at one or more of said remaining bit positions in the respective access address to be equal to respective bit values in the base address seed, bitwise-xor'd with the bit values at one or more bit positions in the respective data-channel identifier. The one or more of said remaining bit positions may be or comprise a plurality of consecutive bit positions. The respective bit values in the base address seed may occupy consecutive bit positions. There may be a one-to-one correspondence between bits positions in the data-channel identifiers and bit positions in the base address seed, but preferably the value of a bit at one bit position in the data-channel identifiers is xor'd with the values of bits at a plurality of bit positions in the base address seed. In this way, a desirable property or properties of the base address seed, over the one or more bit positions, can be imparted to the access addresses, while also providing some differentiation between the access addresses over these one or more bit positions by virtue of the contributions from the data-channel identifiers. In some embodiments, each of said respective bit values in the base address seed is xor'd with the value of a bit at just one common bit position in the respective data-channel identifiers; for example, the last six bits of each access address may be set equal to the last six bits of the base address seed, each xor'd with the first (least-significant) bit of the respective data-channel identifier. If the bit values in the base address seed are a sequence (i.e., occupying consecutive bit positions) that contains no more than a threshold number of bit-value transitions between adjacent bits in the sequence, and these are bitwise xor'd with the bit value at a common bit position in the respective data-channel identifier, for each access address, and included as a sequence in the access address, then these portions of the access addresses should also contain no more than the threshold number of bit-value transitions. An excessive number of bit-value transitions can result in poor auto-correlation performance.

This xor'ing idea is believed to be novel in its own right. Thus, from a further aspect, the invention provides a radio communication apparatus, configured to:

receive or generate a base address seed that satisfies a condition that a sequence of bit values having a predetermined length and a predetermined position in the base address seed contains no more than a threshold number of bit-value transitions between adjacent bits in the sequence;

generate a set of one or more data-channel access addresses from the base address seed, each said data-channel access address corresponding to a respective data-channel identifier from a set of one or more data-channel identifiers, wherein the generating of each access address comprises:

xor'ing each bit value of said sequence of bit values in the base address seed with a binary value derived from the respective data-channel identifier so as to generate a modified sequence of bit values, and setting a sequence of bits in the respective access address to be equal to said modified sequence; and send or receive a radio data packet comprising an access address from the generated set of data-channel access addresses, according to a predetermined radio protocol.

From a further aspect, the invention provides a method of communicating by radio, comprising:

receiving or generating a base address seed that satisfies a condition that a sequence of bit values having a predetermined length and a predetermined position in the base address seed contains no more than a threshold number of bit-value transitions between adjacent bits in the sequence;

generating a set of one or more data-channel access addresses from the base address seed, each said data-channel access address corresponding to a respective data-channel identifier from a set of one or more data-channel identifiers, wherein the generating of each access address comprises:

xor'ing each bit value of said sequence of bit values in the binary base address with a binary value derived from the respective data-channel identifier so as to generate a modified sequence of bit values; and setting a sequence of bits in the respective access address to be equal to said modified sequence; and sending or receiving a radio data packet comprising an access address from the generated set of data-channel access addresses, according to a predetermined radio protocol.

In this way, the number of bit-value transitions can be capped in a desired portion of every access address. This can be achieved while also ensuring that the maximum length of a string of identical bits within this portion is unchanged from that of the sequence in the base address seed (where it may be deliberately limited to a maximum value). This approach nevertheless provides one bit of differentiation between the access addresses, over the portion containing the modified sequence, because the sequence in the access addresses may have one or two possible values, depending on the binary value derived from the respective data-channel identifier.

The predetermined radio protocol may require that a sequence of bit values, having said predetermined length and a predetermined position, in each data-channel access address contains no more than said threshold number of bit-value transitions between adjacent bits in the sequence.

The binary value is preferably derived from the respective data-channel identifier according to a common derivation algorithm, for all the access addresses. The binary value may be derived from a plurality of bit values in the data-channel identifier, but may simply be the value at one predetermined bit position in the respective data-channel identifier—e.g., the value of the least-significant bit of the data-channel identifier. The least-significant bit may be a good choice as, at least in some situation (such as when the identifiers are generated from integers using modulo arithmetic), it may be more likely than any more-significant bit to divide the set of data-channel identifiers into approximately two equal sets.

In embodiments of any aspect disclosed herein, generating each access address may comprise setting values of bits at one or more of said remaining bit positions in the respective access address to be equal to the values of bits at one or more bit positions in the respective data-channel identifier (and not necessarily the same bit positions).

Generating each access address may comprise setting each bit at one or more of said remaining bit positions in the respective access address to be equal to the value of a bit in the access address at said common first bit position or at said common second bit position. Although this limits the set of different access addresses of a given length, it can further help to ensure the access addresses have desirable correlation performance, for example by preventing runs of consecutive bits of the same value beyond a certain length. Thus, where the bit value at a common further bit position in each access address is set equal to the value of the access address at the common first bit position, the common further bit position may be located on the other side of the common second bit position from the common first position (i.e. with the second bit position located between the first bit position and the further bit position). This prevents a run of bit values equal to the value at the second bit position from extending past the common first bit position or past the common further bit position. In some embodiments there may be six, five or fewer bit positions between the common first bit position and the further bit position, so that it is not possible for any of the access addresses to have a run of more than six consecutive zeros or ones that includes the second bit position.

The radio protocol may define an advertising address (e.g., 0x8E89BED6). The advertising address may be the same length as the access addresses, and may be indexed similarly. The common first bit position and the common second bit position may be such that each access address differs from an advertising address in at least one bit position (i.e., has a Hamming distance of one or more from the advertising address). This may be achieved by the common first and second bit positions being such that the bit value at the first bit position in the advertising address equals the bit value at the second bit position in the advertising address.

Generating each access address may comprise setting the value of a bit at a common third bit position in the respective access address to be equal to the value of a bit at a second common predetermined bit position in the base address seed or in the respective data-channel identifier. It may comprise setting a bit value at a common fourth bit position in the respective access address equal to the bitwise complement of the value of the bit at said second common predetermined bit position in the base address seed or in the respective data-channel identifier. The first, second, third and/or fourth bit positions in the access addresses are preferably all different bit positions. The first and second predetermined bit positions in the base address seed or in the respective data-channel identifier are preferably different bit positions.

In embodiments in which the bit value at the first common predetermined bit position is taken from the base address seed (rather than from the respective data-channel identifier), the bit value at the second common predetermined bit position may be taken from the respective data-channel identifier (and could potentially be the same-numbered bit position as the first common predetermined bit position— e.g., both could be the fifteenth bits of their respective values), or it may be taken from the base address seed but at a different bit position to the first common predetermined bit position. In embodiments in which the bit value at the first common predetermined bit position is taken from the respective data-channel identifier (rather than from the base address seed), the bit value at the second common predetermined bit position may be taken from the base address seed (and could potentially be the same bit position as the first common predetermined bit position—e.g., both could be the fifteenth bits within their respective source values), or it may be taken from the respective data-channel identifier but at a different bit position to the first common predetermined bit position.

The distance between the third and fourth bit positions is preferably different from the distance between the first and second bit positions. In this way, the risk of the access address and adjoining data containing periodic repetitions can be reduced or eliminated for two different periods, equal to the two separation distances, and their divisors. This is beneficial for reasons already explained.

The first, second, third and fourth bit positions in the access addresses may be such that each access address differs from an advertising address in at least two bit positions (i.e., having a Hamming distance of at least two). This can reduce the risk of a data-channel access address incorrectly being decoded as the advertising address, or vice versa. Providing extra 'space' around the advertising address, which may typically be the most-frequently transmitted address, can improve the overall reliability of the radio communication system. Thus, in some embodiments, the radio communication apparatus is configured to send or receive an advertising message containing an advertising address, wherein every data-channel access address in the set of data-channel access addresses has a Hamming distance of at least two from the advertising address.

The radio communication apparatus may be configured to test each generated access address and to discard a generated access address if it fails to meet one or more acceptance criteria—e.g., having no more than a maximum number of bit transitions, or containing no more than a maximum number of identical bit strings of a predetermined length.

The radio communication apparatus may comprise a memory and may be arranged to store the generated data-channel access addresses in the memory. In some embodiments, the base address seed may itself be included in the set of data-channel access addresses (e.g., for use as a channel "zero").

The set of data-channel access addresses may be such that, the variance in the later-transmitted or later-received halves of the access addresses, over the set of data-channel access addresses, is greater than the variance in the earlier-transmitted or earlier-received halves of the addresses. The may achieved in various ways, such as by having more bits that depend on bit values from the data-channel identifiers located in the later-transmitted or later-received halves of the access addresses than in the earlier-transmitted or earlier-received halves. It can be advantageous to include more of the differentiating bits in the later-received half of the access addresses because bit errors are typically lower in the later-received bits than in the earlier-received bits, because the decoder is more likely to have achieved an accurate timing and/or frequency lock.

The radio communication apparatus may be embodied in a single device, or it may be distributed over two or more discrete units which may be connected by a wired or wireless link. The radio communication apparatus may comprise an integrated-circuit radio transceiver. It may be or comprise a "radio-on-a-chip". It may have any number of processors, digital logic, analogue circuitry, integrated components, discrete components, antennas, power supplies, inputs, outputs, non-volatile memory, volatile memory, as appropriate. The operations described herein may be performed in hardware, or in software, or both. It will be appreciated that the values of bits at various bit positions in a binary sequence may be set to particular values in many different ways—e.g., by writing individual bits to memory to build up the whole sequence (e.g., a whole access address), or by generating and/or outputting the values in real time, as they are required.

The radio communication apparatus may be configured to receive a radio data packet comprising an access address from the generated set of data-channel access addresses. It may comprise a correlator which is arranged to detect the radio data packet by cross-correlating incoming data against said access address. It may ignore data packets that do not contain an access address that is in the generated set of addresses or in a set of predefined addresses such as an advertising-channel access address. The radio communication apparatus may determine timing and/or frequency information from the correlator.

A radio communication system may comprise two or more such radio communication apparatuses, arranged to exchange radio data packets. The communication apparatuses may form a mesh network, or any other network topology. They may be arranged to generate identical or overlapping sets of data-channel access addresses, and to use these to exchange one or more data packets comprising one or more addresses from the set of the data-channel access addresses.

In one set of embodiments, the radio data packet may comprise audio data. The radio communication apparatus may be a transmitting apparatus and may be arranged to receive audio data as a digital or analogue audio signal (e.g., from a storage memory, or a microphone); it may be arranged to transmit the audio data in a sequence of radio data packets (corresponding to a particular data channel) which may have a common data-channel access address from the generated set of data-channel access addresses. The radio communication apparatus may be arranged to transmit data (e.g., audio data) from two or more distinct channels in respective sequences of radio data packets (which may be transmitted alternately, or interleaved more generally), wherein the packets of each sequence comprise a different respective data-channel access addresses from the generated set. The radio communication apparatus may be a receiving apparatus and may be arranged to receive a sequence of radio data packets which may all have a common data-channel access address from the generated set of data-channel access addresses; it may be arranged to demodulate data (e.g., audio data) from the data packets and output the data as a digital or analogue signal (e.g., to headphones, a loudspeaker, or an amplifier).

The radio communication apparatus may be arranged to demodulate a plurality of sequences of data packets, the data packets of each sequence containing a respective data-channel access address from the generated set. The data packets may contain audio data. The apparatus may be arranged to output respective signals (e.g., audio signals) corresponding to the respective channels.

The audio data on the different data channels could represent left and right audio channels for a stereo music stream, or could represent different channels of a surround-sound audio system, or could encode translations of a spoken message into a number of different respective languages, or could convey public-address messages—e.g., in an airport—intended for a number of different user groups.

The data (e.g., audio data) for some or all data channels may be encrypted. A particular receiver may be able to decrypt only a subset of the data channels.

Features of any aspect or embodiment described herein may, wherever appropriate, be applied to any other aspect or embodiment described herein. Where reference is made to different embodiments or sets of embodiments, it should be understood that these are not necessarily distinct but may overlap.

Certain preferred embodiments of the invention will now be described, by way of example only, with reference to the accompanying drawings, in which:

FIG. 2 is a formula for generating data-channel access addresses according to a first embodiment;

FIG. 3 is a formula for generating data-channel access addresses according to a second set of embodiments;

FIG. 5 is a formula for generating data-channel access addresses according to a third embodiment;

FIG. 6 is a formula for generating data-channel access addresses according to a fourth set of embodiments.

Figure 1:
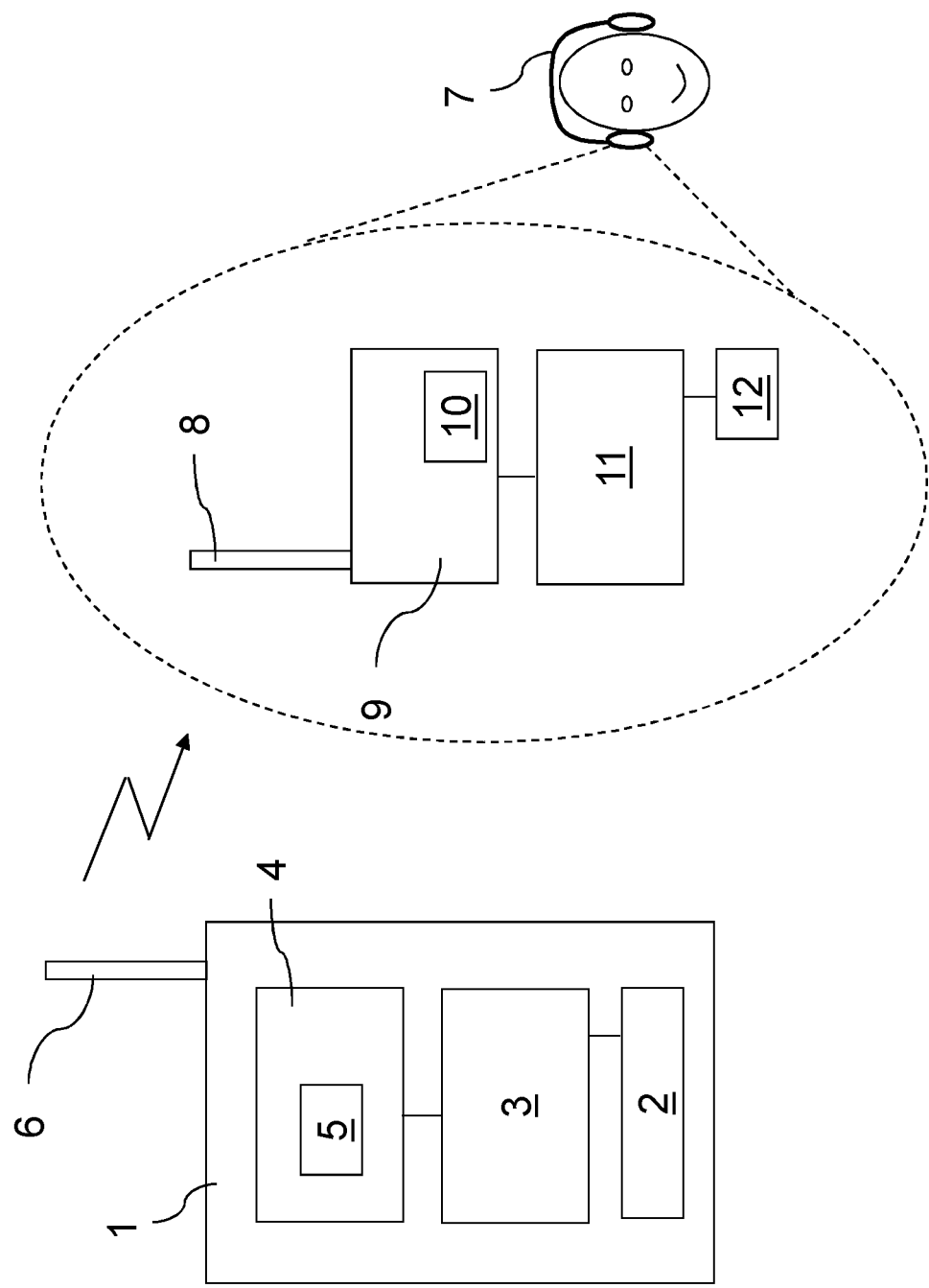
FIG. 1 is a schematic drawing of a radio communication system embodying the invention.

FIG. 1 shows a smartphone 1 which is in communication with a pair of wireless headphones 7. The smartphone 1 and the wireless headphones 7 each separately embody the present invention.

The smartphone 1 has memory 2 which is connected to a microprocessor 3 (such as an ARM™ Cortex A-series, which may be part of a larger system-on-chip such as a Qualcomm Snapdragon™). The microprocessor 3 is connected to a short-range radio transmitter module 4. The short-range radio transmitter 4 includes a data-packet encoder 5 (among other functional elements). Other conventional components, such as user interfaces, a battery, cellular-network radio transceiver, etc. are also present, but are omitted from the drawing for the sake of clarity. The microprocessor 3 and short-range radio transmitter module 4 may be integrated on a single silicon chip or may be separate components. The smartphone 1 has a radio antenna 6, which may be integrated with the short-range radio transmitter 4 or may be external to it. The memory 2 stores music, such as mp3 audio data.

FIG. 1 includes a magnified view of certain components that are embedded within the wireless headphones 7. These include, among other conventional components (not shown), an antenna 8, suitable for receiving radio communications from wireless-personal-area-network devices such as the smartphone 1. This is connected to a short-range radio receiver module 9. The radio receiver module 9 includes data-packet decoding logic 10, among other functional elements. The short-range radio transmitter 4 and receiver 9 may implement any appropriate radio communication protocol, such as IEEE 802.15.4, Bluetooth™, Bluetooth Low Energy™, Z-Wave™ ZigBee™, etc. The radio receiver 9 is connected to a microprocessor 11 (such as an ARM™ Cortex M-series), which can output analogue stereo audio data to a stereo amplifier 12. The amplifier 12 is connected to the loudspeakers in the headphones 7 along separate left and right channels.

In use, the microprocessor 3 on the smartphone 1 reads digital music data from the memory 2. This is passed to the transmitter module 4 where the data-packet encoder 5 generates two flows of data packets—one flow for the left audio channel and one flow for the right audio channel. The transmitter module 4 generates two data-channel access addresses from one base address seed. The base address seed may have been generated away from the smartphone 1 and sent to the smartphone 1, or the transmitter module 4 may generate the base address seed—e.g., by generating a random 32-bit value in response to a request to set up the stereo audio stream. The base address may be required to meet one or more conditions such as having no more than a maximum number of bit-value transitions between adjacent bits, and having no runs of a single bit value longer than a maximum length. The generated data-channel access addresses may be required to meet the same conditions, or a different set of conditions. In some embodiments, the base address and the generated data-channel access addresses are each 32 bits long and are required to meet one or more, or all, of the conditions (i) (viii) set out in the introduction above (e.g., having no more than six consecutive zeros or ones, not having all four octets equal, having no more than 24 bit transitions, and having a minimum of two transitions in its most significant six bits). The left audio channel is assigned a channel number of one, while the right audio channel is assigned a channel number of two. The generation of the data-channel access addresses is described in more detail below. Channel zero may be reserved, e.g., for a control channel.

The transmitter module 4 disseminates the base access address by advertising the presence of an isochronous stereo audio stream in advertising packets. The radio receiver module 9 in the wireless headphones 7 receives the advertising packets and decodes the base address. The transmitter module 4 may also communicate the number of available channel numbers. The content of each channel (e.g., Channel 1: front-left audio; Channel 2: front-right audio; Channel 3: rear-left audio; Channel 4: rear-right audio; etc.) may be predefined, or may be communicated by the transmitter module 4, potentially at a higher protocol layer, such as at the application layer. The data-packet decoding logic 10 in the receiver module 9 generates the corresponding data-channel access addresses from the base address and channel numbers, as explained below, for the channel or channels that it should listen to. Correlators in the data-packet decoding logic 10 are then set to receive and demodulate data packets that contains the data-channel access addresses, from the smartphone 1. The receiver module 9 passes digital data representing the left and right audio signals to the microprocessor 11, which performs any appropriate audio processing and digital-to-analogue conversion. The stereo analogue signals are sent to the amplifier 12 which drives the left and right loudspeakers. Additional steps for synchronizing the two channels, performing error correction, etc. may of course be performed, according to the particular radio protocol. The communication may be coded or uncoded.

FIG. 2 shows how the data-channel access addresses are generated in the smartphone 1 and in the headphones 7.

The data-packet encoder 5 and the data-packet decoding logic 10 each calculate two 7-bit channel identifier values corresponding to the left and right channel numbers (one and two, respectively) by multiplying the channel number by 61, modulo 128. The left channel identifier is thus 00111101 in binary, while the right channel identifier is 01111010 in binary. Of course, other applications (e.g., streaming 5.1 surround sound) may have more than two channels associated with one data stream, in which case the modulo arithmetic ensures the channel identifiers are kept to 7 bits. Typically, there may be up to 32 channels available to use. For the purposes of this explanation, each 7-bit data-channel identifier is indexed as $b_6b_5b_4b_3b_2b_1b_0$, while the 32 bits of the base address seed are indexed $a_{31}a_{30} \ldots a_1a_0$.

The data-packet encoder 5 and the data-packet decoding logic 10 each generate the same two 32-bit data-channel access addresses using the calculation shown in the FIG. 2, using the same base address but the two different respective data-channel identifiers. The symbol ⊕ denotes bit-wise XOR.

Bits 0-15 of each generated access address are unchanged from the base address, so, as long as the base address meets the following coded PHY conditions, each access address will also:
(ix) have at least three ones in the least significant 8 bits; and
(x) have no more than eleven transitions in the least significant 16 bits.

The complementary values $a_{15}$ and $\overline{a}_{15}$ at bits 16, 19 and 22 prevent long runs of same value, from the right and inbetween, so that each access address:
(iii) shall have no more than six consecutive zeros or ones.

Bits 26-31 preserve the same number of bit-value toggles in the six most-significant bits from the base address, to meet rule:
(viii) It shall have a minimum of two transitions in the most significant six bits.

Bits 23 & 25 are either 0 & 1 or 1 & 0, respectively, and therefore prevent a run of six zeros or ones occupying bit 20 through to bit 25. They also prevent a run of more than four zeros or ones in the range from bit 31 through to bit 23 (when combined the bit-value transition requirement in bits 26-31).

If the advertising channel uses the access address 0x8E89BED6, bits 16, 19, 22, 23 and 25 ensure that, for each generated access address, the Hamming distance to the advertising access address is at least two, as can be seen from the following table:

| bit index | 25 | 23 | 22 | 19 | 16 |
|---|---|---|---|---|---|
| advertising address | 1 | 1 | 0 | 1 | 1 |
| generated addresses | $b_1$ | $\overline{b}_1$ | $\overline{a}_{15}$ | $a_{15}$ | $\overline{a}_{15}$ |

This satisfies the rule that each data-channel access address:
(iv) is not the advertising channel packets' Access Address.

However, it goes further, by separating the access addresses from the advertising access address in at least two bit positions.

The following table indicates the approximate probability of a generated access address being invalid, based on a set of rules that incorporate the main BLE rules, assuming the base address seed meets the rules. Coded and uncoded rules sets are considered separately.

| Rule | Probability a random 32-bit sequence fails | Probability a generated address fails given a valid base address (uncoded PHY) | Probability generated address fails given a valid base address (coded PHY) |
|---|---|---|---|
| It shall have no more than six consecutive zeros or ones. | Zeros: 10.3% Ones: 10.3% | Never | Never |
| It shall not be the advertising channel packets' Access Address. | $1:2^{32}$ | Never | Never |
| It shall not be a sequence that differs from the advertising channel packets' Access Address by only one bit. | $32:2^{32}$ | Never | Never |
| It shall not have all four octets equal. | $256:2^{32}$ = ~1:1.7e7 | ~1:1.0e7 | ~1:1.4e7 |
| It shall have no more than 24 transitions. | 0.04% | 0.090% | 0.033% |
| It shall have a minimum of two transitions in the most significant six bits. | 18.8% | Never | Never |
| Any uncoded-PHY rule | 33.2% | 0.089% | 0.033% |
| It shall have at least three ones in the least significant 8 bits. | 14.5% | n/a | Never |
| It shall have no more than eleven transitions in the least significant 16 bits. | 1.8% | n/a | Never |
| Any coded-PHY rule | 43.2% | n/a | 0.033% |

As can be seen, the chance of a generated access address being invalid is very low. The devices may nevertheless test every generated address against a set of rules, and discard any that don't meet, in which case this low probability ensures a fast and power-efficient generation process, or the devices may perform no filtering on the basis that non-compliant addresses will only be generated rarely.

FIG. 3 shows a more-general set of embodiments, in which the data-packet encoder 5 and the data-packet decoding logic 10 calculate the channel identifier values by multiplying the channel number by a value M, then adding a value S, all modulo 128. The variables M and S may take any values. An embodiment in which M=61 and S=0 is identical to the embodiment described above, with reference to FIG. 2. However, M and S may have other values in other embodiments. In another set of embodiments, M=61 and S=27, while in a further set of embodiments, M=35 and S=42. Certain values can provide properties in the generated access addresses that may be desirable in particular circumstances. The values of M and S may be fixed for one or both devices—e.g., hardcoded within the data-packet encoder 5 and the data-packet decoding logic 10—or they may be variable—e.g., negotiated between the devices, or set by a third-party device.

Figure 4:
FIG. 4 is a chart of Hamming distance between data-channel access addresses for various pairs of channel numbers, generated by the second embodiment.

FIG. 4 shows a table that gives the Hamming distance between pairs of 32 access addresses generated using the formulae in FIG. 3, with M=35 and S=42, using channel numbers zero to thirty-one. Because Hamming distance is a symmetrical operation, the values for the top-right half of the matrix are just a reflection of those in the bottom-left half; the top-right half has been left blank in FIG. 3 to aid understanding.

These values of M and S have been found to results in various desirable properties. In particular, as can be seen from the region above the zig-zag line in FIG. 4, for all pairs of the 32 channel numbers that are separated by three or less (i.e., |Ch Y−Ch X|≤3, for channel numbers Ch X and Ch Y), the Hamming distance between the generated access addresses is at least four. Furthermore, for all adjacent channel numbers (i.e., |Ch Y−Ch X|≤1), the Hamming distance between the generated access addresses is at least eight. It is expected that consecutive runs of channel numbers will commonly be used together—and low-valued channel numbers in particular—and so ensuring a relatively-high number of bit differences between the access addresses for such channel numbers is beneficial in reducing misidentification of access addresses in such situations.

FIG. 4 also shows that, for this particular embodiment, the access addresses for every one of the thirty-one channels numbered one to 31 is separated from the channel-zero access address by at least three bits. It is expected that channel zero will be used in most situations—either because it is used as a special control channel, or because developers will typically number the channels from zero upwards—so having a separation of at least three bits is desirable.

FIG. 4 also shows that, for these values of M and S, there are no pairs of access addresses that are separated by only one bit, and, as already noted, the only pairs that are separated by exactly two bits correspond to channel numbers that are at least four channels apart.

The first four channels (i.e., channels zero to three) have access addresses that differ from each other in at least 5 bits.

Values of M and S may be chosen to provide desirable properties for any particular situation.

FIG. 5 shows an alternative formula for generating data-channel access addresses. It has many of the same features as the formula in FIG. 2, such as including complementary bit pairs generated from a bit in the base address and generated from a bit position in the data-channel identifiers. It also has the property that all four octets can never be equal since bit 23 must be the complement of bit 15. However, it does not have the desirable property of guaranteeing at least two bit differences over an advertising-channel access-address value of 0x8E89BED6.

FIG. 6 illustrates a fourth set of embodiments that use the same address-generation formula as FIG. 5, but having the more-general form of channel identifier as described above with reference to FIG. 3. The letters M and S may take any appropriate values, as described above.

It will be appreciated by those skilled in the art that the invention has been illustrated by describing one or more specific embodiments thereof, but is not limited to these embodiments; many variations and modifications are possible, within the scope of the accompanying claims. In particular, many different formulae for generating data-channel access addresses fall within the accompanying claims, not all of which will produce addresses satisfying all of the BLE rules set out above. Some may, however, generate addresses that have desirable properties in the context of other radio protocols.

The invention claimed is:

1. A radio communication apparatus comprising:
   a radio transceiver; and
   a processing system comprising hardware logic, or comprising a processor and a memory storing software instructions for execution by the processor,
   wherein:
   the radio communication apparatus is configured to receive or generate a base address seed;
   the processing system is configured to generate a set of data-channel identifiers by applying a modular arithmetic operation to a sequence of successive integers, and
   the processing system is configured to generate a set of data-channel access addresses from the base address seed, each said data-channel access address corresponding to a respective data-channel identifier from the set of data-channel identifiers, wherein the generating of each access address comprises:
   setting the value of a bit at a common first bit position in the respective access address to be equal to the value of a bit at a first common predetermined bit position in the base address seed or in the respective data-channel identifier;
   setting the value of a bit at a common second bit position in the respective access address to be equal to the bitwise complement of the value of the bit at said first common predetermined bit position in the base address seed or in the respective data-channel identifier; and
   setting values of one or more bits at one or more of the remaining bit positions in the respective access address in dependence on the values of one or more bits at one or more bit positions in the base address seed and one or more bit positions in the respective data-channel identifier that are not said first common predetermined bit position in the base address seed or in the respective data-channel identifier; and
   the radio transceiver is configured to send or receive a radio data packet comprising an access address from the generated set of data-channel access addresses, according to a predetermined radio protocol.

2. The radio communication apparatus of claim 1, wherein the predetermined radio protocol requires each access address to contain no more than a predetermined number of successive "zero" or "one" bits within a contiguous portion of the access address that contains the common first and second bit positions, and wherein the second bit position is offset from the first bit position by no more than said predetermined number of bits.

3. The radio communication apparatus of claim 1, configured to receive the base address seed in an advertising message.

4. The radio communication apparatus of claim 1, configured to use a random-number generator to generate the base address seed.

5. The radio communication apparatus of claim 1, wherein the base address seed satisfies one or more predetermined conditions relating to the distribution of bit values within the base address seed, and wherein each of the generated data-channel access addresses satisfies the same one or more predetermined conditions.

6. The radio communication apparatus of claim 1, wherein each data-channel identifier of the set of data-channel identifiers is equal to a respective integer, from the corresponding sequence of one or more integers, multiplied by a first value, plus a non-zero summand, modulo a second value.

7. The radio communication apparatus of claim 1, wherein each data-channel identifier of the set of data-channel identifiers is equal to a respective integer, from the corresponding sequence of one or more integers, multiplied by thirty-five, plus forty-two, modulo one-hundred-and-twenty-eight.

8. The radio communication apparatus of claim 1, wherein the common first bit position is adjacent the common second bit position.

9. The radio communication apparatus of claim 1, wherein the common first bit position is offset from the common second bit position by an even number of bits.

10. The radio communication apparatus of claim 1, wherein the generating of each access address comprises setting bit values at one or more of said remaining bit positions in the respective access address to be equal to respective bit values in the base address seed, bitwise-xor'd with the bit values at one or more bit positions in the respective data-channel identifier.

11. The radio communication apparatus of claim 10, wherein said one or more of said remaining bit positions comprises a plurality of consecutive bit positions, and wherein the generating of each access address comprises setting bit values at the plurality of consecutive bit positions in the respective access address to be equal to respective bit values in the base address seed each xor'd with the value of a bit at one common bit position in the respective data-channel identifier.

12. The radio communication apparatus of claim 1, wherein the radio protocol defines a fixed advertising address, and wherein the common first bit position and the common second bit position are such that each data-channel access address in the set of data-channel access addresses differs from the advertising address in at least one bit position or in at least two bit positions.

13. The radio communication apparatus of claim 1, wherein the generating of each access address comprises setting the value of a bit at a common third bit position in the respective access address to be equal to the value of a bit at a second common predetermined bit position in the base address seed or in the respective data-channel identifier, and setting the value of a bit at a common fourth bit position in the respective access address equal to the bitwise complement of the value of the bit at said second common predetermined bit position in the base address seed or in the respective data-channel identifier.

14. The radio communication apparatus of claim 13, wherein the first and second bit positions are separated by a first distance, and wherein the third and fourth bit positions are separated by a second distance that is different from the first distance.

15. The radio communication apparatus of claim 1, configured to send or receive a plurality of interleaved sequences of radio data packets, wherein the data packets of each sequence comprise a different respective access address from the generated set of data-channel access addresses.

16. The radio communication apparatus of claim 1, comprising an input or output for an audio signal, wherein said radio data packet comprises audio data.

17. A method of communicating by radio, comprising:

receiving or generating a base address seed;

generating a set of data-channel identifiers by applying a modular arithmetic operation to a sequence of successive integers;

generating a set of one or more data-channel access addresses from the base address seed, each said data-channel access address corresponding to a respective data-channel identifier from the set of data-channel identifiers, wherein the generating of each access address comprises:

setting the value of a bit at a common first bit position in the respective access address to be equal to the value of a bit at a first common predetermined bit position in the base address seed or in the respective data-channel identifier;

setting the value of a bit at a common second bit position in the respective access address to be equal to the bitwise complement of the value of the bit at said first common predetermined bit position in the base address seed or in the respective data-channel identifier; and setting the values of one or more bits at one or more of the remaining bit positions in the respective access address in dependence on values of one or more bits at one or more bit positions in the base address seed and one or more bit positions in the respective data-channel identifier that are not said first common predetermined bit position in the base address seed or in the respective data-channel identifier; and sending or receiving a radio data packet comprising an access address from the generated set of data-channel access addresses, according to a predetermined radio protocol.

18. The method of claim 17, configured to use a random-number generator to generate the base address seed.

19. The method of claim 17 wherein the base address seed satisfies one or more predetermined conditions relating to the distribution of bit values within the base address seed, and wherein each of the generated data-channel access addresses satisfies the same one or more predetermined conditions.

20. The method of claim 17, wherein the common first bit position is offset from the common second bit position by an even number of bits.

21. A radio communication apparatus comprising:
a radio transceiver; and
a processing system comprising hardware logic, or comprising a processor and a memory storing software instructions for execution by the processor,
wherein:
the radio communication apparatus is configured to generate a base address seed using a random-number generator;
the processing system is configured to generate a set of one or more data-channel access addresses from the base address seed, each said data-channel access address corresponding to a respective data-channel identifier from a set of one or more data-channel identifiers, wherein the generating of each access address comprises:
setting the value of a bit at a common first bit position in the respective access address to be equal to the value of a bit at a first common predetermined bit position in the base address seed or in the respective data-channel identifier;
setting the value of a bit at a common second bit position in the respective access address to be equal to the bitwise complement of the value of the bit at said first common predetermined bit position in the base address seed or in the respective data-channel identifier; and
setting values of one or more bits at one or more of the remaining bit positions in the respective access address in dependence on the values of one or more bits at one or more bit positions in the base address seed and one or more bit positions in the respective data-channel identifier that are not said first common predetermined bit position in the base address seed or in the respective data-channel identifier; and
the radio transceiver is configured to send or receive a radio data packet comprising an access address from the generated set of data-channel access addresses, according to a predetermined radio protocol.

22. The radio communication apparatus of claim 21, wherein the base address seed satisfies one or more predetermined conditions relating to the distribution of bit values within the base address seed, and wherein each of the generated data-channel access addresses satisfies the same one or more predetermined conditions.

23. The radio communication apparatus of claim 21, wherein the processing system is configured to generate the data-channel identifiers by applying a modular arithmetic operation to a sequence of successive integers.

24. The radio communication apparatus of claim 21, wherein the common first bit position is offset from the common second bit position by an even number of bits.

25. A radio communication apparatus comprising:
a radio transceiver; and
a processing system comprising hardware logic, or comprising a processor and a memory storing software instructions for execution by the processor,
wherein:
the radio communication apparatus is configured to receive or generate a base address seed;
the processing system is configured to generate a set of one or more data-channel access addresses from the base address seed, each said data-channel access address corresponding to a respective data-channel identifier from a set of one or more data-channel identifiers, wherein the base address seed satisfies one or more predetermined conditions relating to the distribution of bit values within the base address seed, and wherein each of the generated data-channel access addresses satisfies the same one or more predetermined conditions, and wherein the generating of each access address comprises:
setting the value of a bit at a common first bit position in the respective access address to be equal to the value of a bit at a first common predetermined bit position in the base address seed or in the respective data-channel identifier;
setting the value of a bit at a common second bit position in the respective access address to be equal to the bitwise complement of the value of the bit at said first common predetermined bit position in the base address seed or in the respective data-channel identifier; and
setting values of one or more bits at one or more of the remaining bit positions in the respective access address in dependence on the values of one or more bits at one or more bit positions in the base address seed and one or more bit positions in the respective data-channel identifier that are not said first common predetermined bit position in the base address seed or in the respective data-channel identifier; and
the radio transceiver is configured to send or receive a radio data packet comprising an access address from the generated set of data-channel access addresses, according to a predetermined radio protocol.

26. The radio communication apparatus of claim 25, configured to use a random-number generator to generate the base address seed.

27. The radio communication apparatus of claim 25, wherein the processing system is configured to generate the data-channel identifiers by applying a modular arithmetic operation to a sequence of successive integers.

28. The radio communication apparatus of claim 25, wherein the common first bit position is offset from the common second bit position by an even number of bits.

29. A radio communication apparatus comprising:
a radio transceiver; and
a processing system comprising hardware logic, or comprising a processor and a memory storing software instructions for execution by the processor,
wherein:
the radio communication apparatus is configured to receive or generate a base address seed;
the processing system is configured to generate a set of one or more data-channel access addresses from the base address seed, each said data-channel access address corresponding to a respective data-channel identifier from a set of one or more data-channel identifiers, wherein the generating of each access address comprises:
setting the value of a bit at a common first bit position in the respective access address to be equal to the value of a bit at a first common predetermined bit position in the base address seed or in the respective data-channel identifier;
setting the value of a bit at a common second bit position in the respective access address to be equal to the bitwise complement of the value of the bit at said first common predetermined bit position in the base address seed or in the respective data-channel identifier, wherein the common first bit position is offset from the common second bit position by an even number of bits; and setting values of one or more bits at one or more of the remaining bit positions in the respective access address in dependence on the values of one or more bits at one or more bit positions in the base address seed and one or more bit positions in the respective data-channel identifier that are not said first common predetermined bit position in the base address seed or in the respective data-channel identifier; and the radio transceiver is configured to send or receive a radio data packet comprising an access address from the generated set of data-channel access addresses, according to a predetermined radio protocol.

30. The radio communication apparatus of claim 29, configured to use a random-number generator to generate the base address seed.

31. The radio communication apparatus of claim 29, wherein the base address seed satisfies one or more predetermined conditions relating to the distribution of bit values within the base address seed, and wherein each of the generated data-channel access addresses satisfies the same one or more predetermined conditions.

32. The radio communication apparatus of claim 29, wherein the processing system is configured to generate the data-channel identifiers by applying a modular arithmetic operation to a sequence of successive integers.

\* \* \* \* \*